Patented Oct. 8, 1935

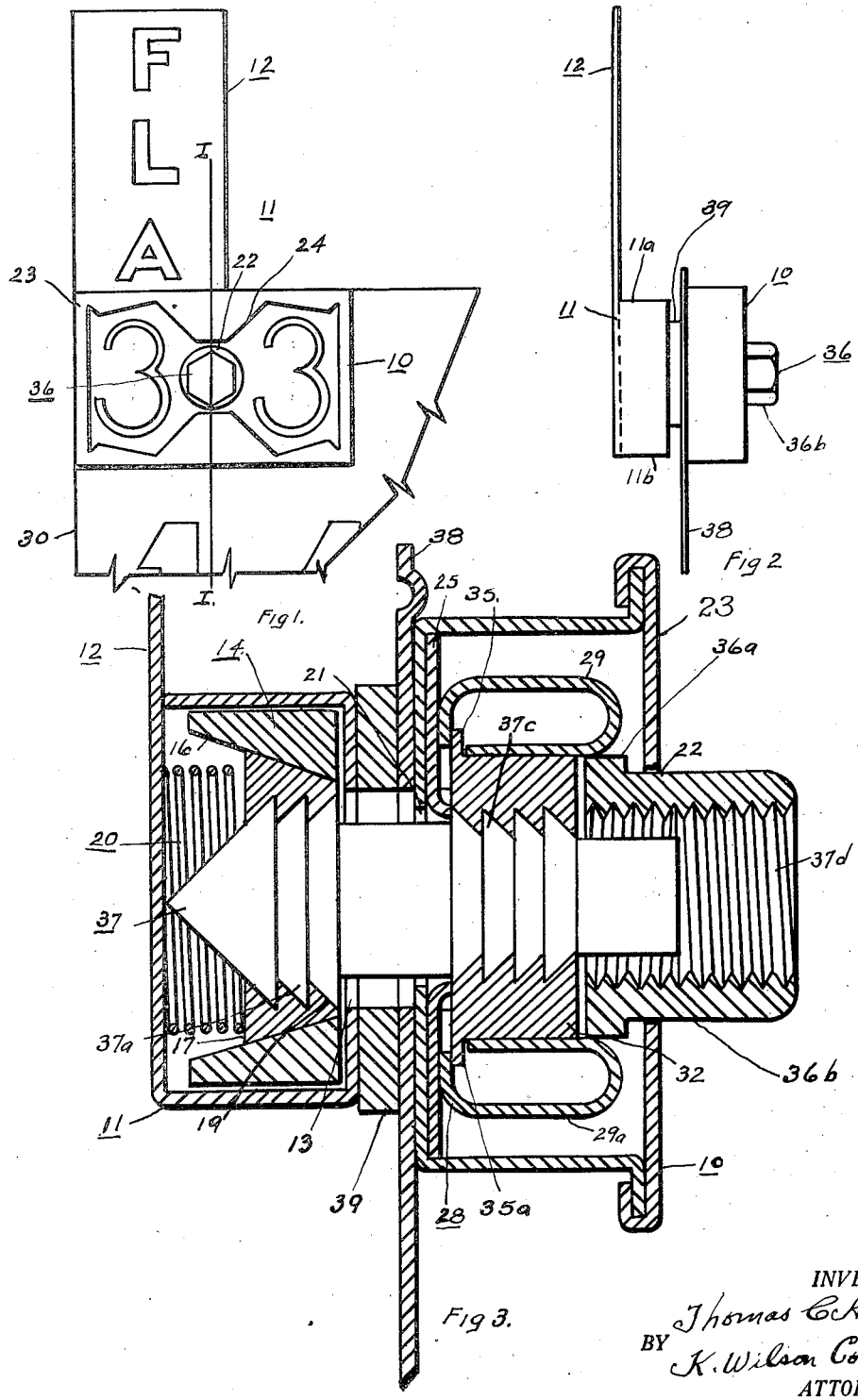

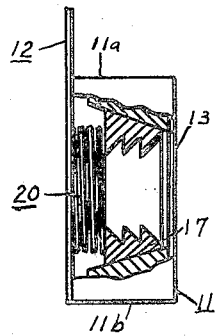
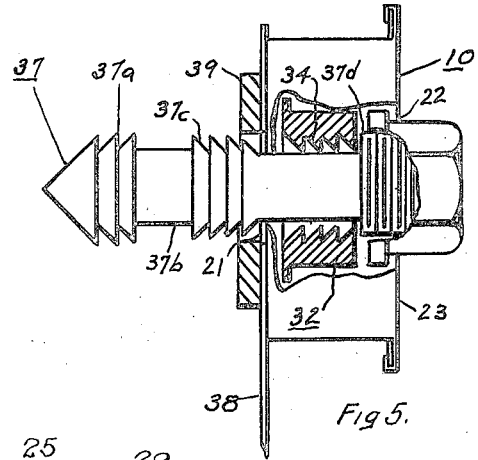
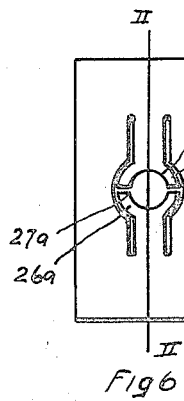
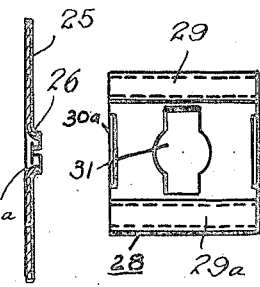
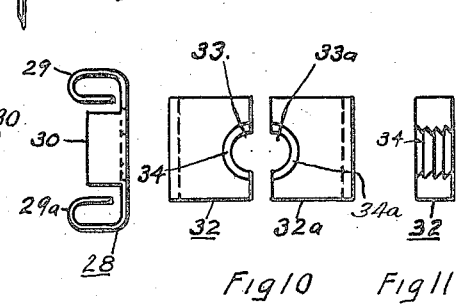
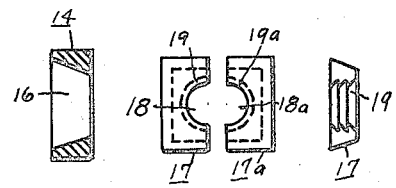
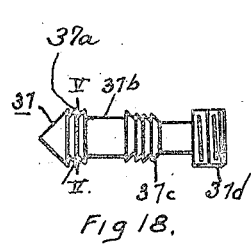
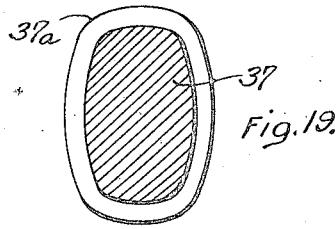

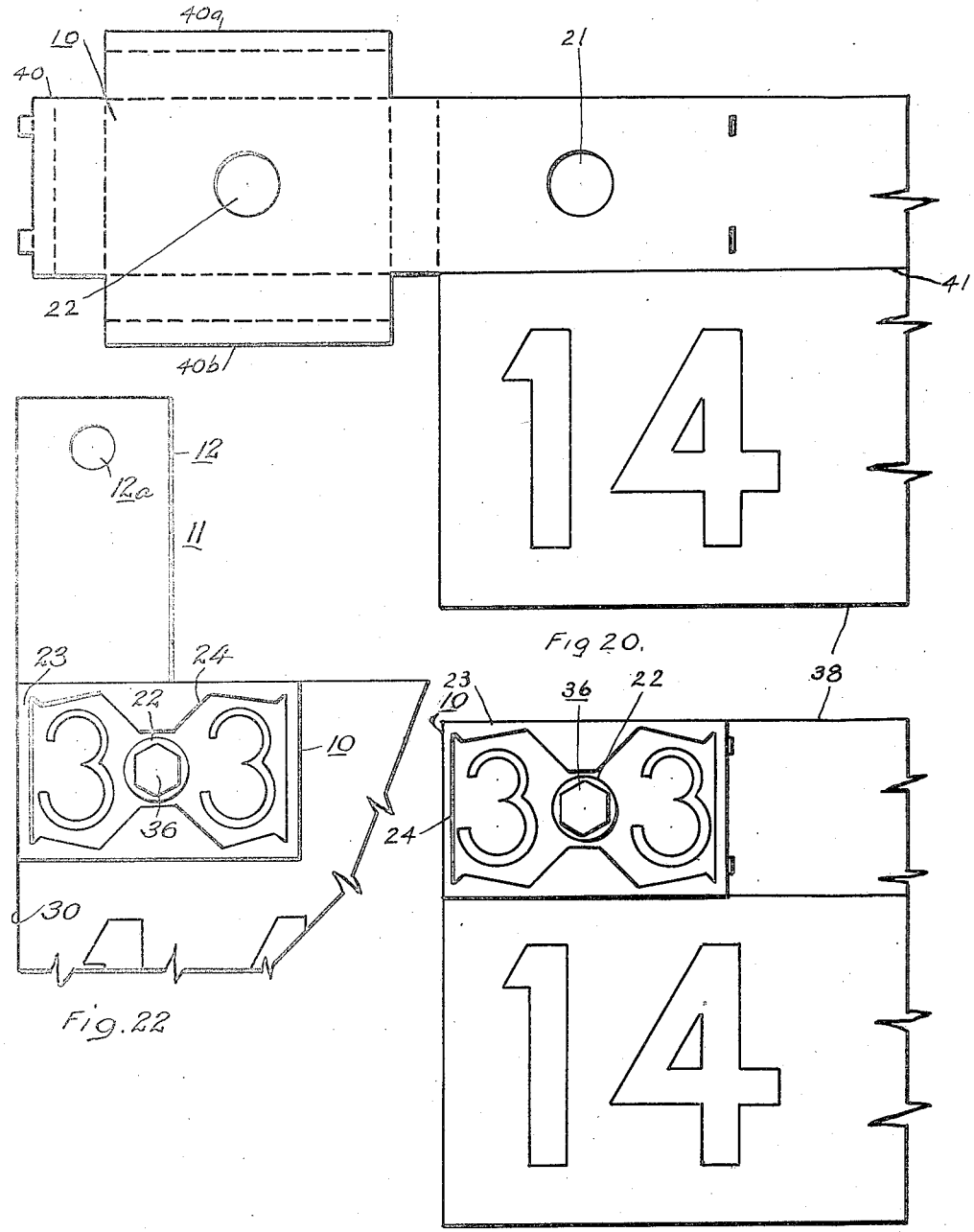

2,016,826

UNITED STATES PATENT OFFICE 2,016,826

SEALING DEVICE

Thomas C. Arnold, Quincy, Fla., assignor of one-half to Arthur Corry, Quincy, Fla.

Application October 18, 1933, Serial No. 694,129

13 Claims. (Cl. 40—125)

This invention relates to sealing devices, and more particularly to a new and improved means for holding automobile license plates in engagement with supports provided for that purpose, in such a manner as to make removal of the tag impossible without destroying or mutilating the seal in such a manner as to make the fact of tampering apparent to even a casual observer. While I shall describe my invention primarily in connection with automobile tags, I do not intend to limit myself to this use, but intend that my device may be used in connection with meters, meter cabinets, or any other purpose in which it is desirable to unite elements in such a fashion that once sealed they cannot be separated without destruction of essential visible parts.

Constructions known to the art, calculated to effectuate the foregoing results, are subject to evasion for a number of reasons, one of the most effective means of such being to substitute one or more of the special parts comprising the device in question, with ordinary parts, and then install the device in what outwardly appears to be a perfectly conventional and proper manner, yet which is entirely ineffective to accomplish the purpose for which the seal is intended. This objection is particularly pertinent when considered in connection with automobile tags, as it is the custom to furnish the owner with the tag and the sealing device and require him to mount it himself, supervision by the state of this operation being impracticable for a number of reasons, which fact gives the owner ample opportunity to exercise his ingenuity in circumventing the device and subverting the purpose for which it is intended.

An object of this invention is to provide a sealing means the parts of which cannot be substituted or rendered ineffective or removed without destroying the device.

Another object is to provide in a device of this character, a rear indicator which readily shows whether or not the seal has been properly installed, said indicator showing at a glance the condition of the seal at the rear of the tag.

Another object is to provide means in a device of this character which will insure an attachment which will be permanent, and free from rattling or any tendency to work loose.

A still further object is to provide a sealing means which is quickly and easily attachable, but which once attached can be removed only with such damage as cannot be repaired or concealed.

Another object is to provide a device of this type which is adaptable to a wide range of uses.

Another object is to provide cheapness of construction, and efficiency in operation in a device of the foregoing character.

These and other objects made apparent in the course of the following description are accomplished by means of my sealing device, which is illustrated in the drawings herein, in which:

Fig. 1 is a front view of my sealing means associated with an automobile tag, said tag being broken away near its upper left-hand corner.

Fig. 2 is a side view of the elements shown in Fig. 1, illustrating both the front and rear portions of the sealing device.

Fig. 3 is an enlarged vertical cross-sectional view of the device illustrated in Fig. 1, taken along the line I—I thereof.

Fig. 4 is an enlarged view of the rear portion of my seal, part of the side wall being broken away and part of the interior being shown in cross-section to better illustrate the operation of the elements therein.

Fig. 5 is an enlarged side view of the front portion of my seal, a section of the side wall being broken away and some of the interior parts being shown in cross-section to indicate their position therein.

Fig. 6 is a front view of the retaining plate used within my device.

Fig. 7 is a vertical cross-sectional view of the plate illustrated in Fig. 6, taken along the line II—II thereof.

Fig. 8 is a front view of a box-like retainer element used within my device.

Fig. 9 is a side view of the retainer illustrated in Fig. 8.

Fig. 10 is a front view of two identical locking elements housed within the retainer shown in Fig. 8.

Fig. 11 is a side view of one of the locking elements shown in Fig. 10.

Fig. 12 is a top view of the nut used with my device.

Fig. 13 is a cross-sectional view of the nut shown in Fig. 12, taken along the line III—III thereof.

Fig. 14 is a top view of the rectangular locking collar used in conjunction with the rear of my device.

Fig. 15 is a cross-sectional view of the collar illustrated in Fig. 14, taken along the line IV—IV of said figure.

Fig. 16 is a top view of two identical wedge-shaped locking blocks used within my sealing device, Fig. 17 is a side view of one of the blocks shown in Fig. 16.

Fig. 18 is a side view of the special bolt employed in conjunction with my sealing device.

Fig. 19 is a cross-sectional view of the bolt shown in Fig. 18, taken along the line V—V thereof.

Fig. 20 is a plan view showing the layout for making the front of the sealing device integral with an automobile tag, and of one piece of metal.

Fig. 21 illustrates the device shown in Fig. 20, in assembled form and ready to be installed on a motor car.

Fig. 22 is a view of a modification of my device, illustrating a form that may be used as a seal for box-cars, meters, and the like.

Referring now to the drawings (Figs. 1, 2, 4 and 5), my super-sealing device consists of a front element 10 and a rear element 11, which elements when united and engaging an article such as an automobile tag, cannot be separated without substantial damage to one or both of the parts.

Rear element 11 consists of a box-like container fabricated from one or more pieces of metal of suitable strength and thickness, and entirely enclosing certain locking elements. Associated and preferably integral with 11 is a metal extension forming an indicator 12, which extends beyond the tag and supporting bracket of an automobile, and is intended to be conspicuously decorated so that any person can readily see that the back connection furnished has been used with my sealing device, and is in place and in proper condition. Indicator 12 may be allowed to project from behind the supporting bracket, either upwardly, out to the side, or downwardly, the manner selected being that which will allow the greatest unobstructed view of said element, as the purpose of the indicator is to show that proper installation has been made at the rear of the tag, and to insure that such installation remains permanent.

An elliptical hole 13 of sufficient size to admit a locking bolt is provided in the front of 11, and within said element and centered over said hole is a rectangular collar 14 (Fig. 14), a rectangular hole 15 being provided therein, the walls 16 of which diverge upwardly and outwardly so that the diameter of the hole at the top of the element is greater than at its bottom or under-side. Seating within 14 and having outside dimensions complementary therewith, are two identical wedge-shaped locking elements 17 and 17a (Fig. 16), said wedges preferably being rectangular in form, and each having a circular cut-away portion 18 and 18a, the walls of which are provided with one or more concentric shoulders or notches 19 and 19a. A coil spring 20 of suitable strength to normally keep wedges 17 and 17a firmly seated within 14 as shown in the drawing (Fig. 3), is likewise placed within back mounting 11, and when thus assembled, the outer walls of the device are crimped, spot-welded or otherwise securely united in such a manner as to preclude any tampering with the elements housed within, without destroying the said outer walls, and more particularly, damaging indicator 12 in such a fashion as to make the fact of such at once apparent.

Attention is now directed to the front connection or mounting 10 of my sealing device. This element is likewise formed of one or more pieces of metal of suitable thickness, and comprises a box-like container having a hole 21 in the back thereof, and a somewhat larger hole 22 in its front. Upon the face 23 of 10 may be placed any desired legend, depending upon the use to which the device is put, the number "33" shown in the drawings (Fig. 1), representing the year in which the seal is attached, as when used in connection with an automobile license tag. Near the outside edges of face 23 is indented a line 24, said line preferably being irregular or jagged in its course as shown in the drawings, and almost but not quite perforating the metal. The purpose of this indentation is to provide a point of breakage should anyone attempt to tamper with the seal, said line of frangibility being of such a nature that any stress of an unusual character applied to the seal will be transmitted directly thereto, with a result that the face of the seal will be broken in a ragged, irregular manner, and in fragments, so that it will be impossible to restore the seal to its former condition.

Constructing the face of the seal in the foregoing manner, furnishes an additional check on the integrity of the seal, tampering at once being apparent to an officer, or other person, upon inspection.

Housed within 10 and centered over hole 21 is is a retaining plate 25 (Fig. 6), which plate is made of spring-like metal, and has formed on either side of its center, as by stamping, two flexible fingers or tongues 26 and 26a, said tongues having cut-out portions 27 and 27a providing an opening of sufficient size to permit the passage of a bolt therethrough when the opening is enlarged by the flexing of said tongues.

Adjacent retaining plate 25 and within 10 is a box-like retainer element 28 (Fig. 8), which may be formed of spring-like metal, and has curved wing portions 29 and 29a on opposite sides, and side members 30 and 30a on the remaining two sides. An opening 31 is provided in the middle of 28 of sufficient size to allow clearance for the curved sections of tongues 26 and 26a of 25. Snugly fitting within retainer 28 and held in proper position and alignment by the tension provided by wings 29 and 29a thereof, are two identical checking elements 32 and 32a (Fig. 16), said elements being of metal and having circular cut-away portions 33 and 33a provided with one or more concentric shoulders or notches 34 and 34a. If desired, the faces of 32 and 32a intended to engage the bottom of retainer 28 may be provided with engaging means such as flanges 35 and 35a, which passing beneath the ends of wings 29 and 29a provide a more secure retention of the checking elements within the retainer box.

A nut 36 (Fig. 12), is positioned within 10 adjacent to checking elements 32 and 32a, said nut having a round shoulder or skirt 36a at its base, of greater diameter than hole 22, which serves to keep the nut within the box and prevent its removal without destroying the face thereof. The upper portion 36b of nut 36 is passed through hole 22.

It will be noted that 36b is of sufficient size to substantially fill hole 22, allowing reasonable clearance however for rotation of the nut; and that for convenience in performing this tightening operation, 36b may be of angular shape, such as the hexagon shown, for instance, in order to provide a holding surface for a wrench or like tool.

A special bolt 37 (Fig. 18), is provided for uniting the front of my device with its rear portion, such union being contemplated after said bolt has been passed through the article or articles intended to be sealed by my invention. The head of 37, which may be conical in shape, has in close proximity thereto one or more concentric notches or circular extensions 37a, which notches are of the same pitch, and complementary to like notches 19 and 19a provided in locking elements 17 and 17a. The head of bolt 37, including 37a, is preferably somewhat flattened on two sides to facilitate the passage thereof through the slots in the tag and bracket, and also to prevent rotation of the bolt, as hole 13 is similar in contour and bolt 37 is contemplated to fit the sides thereof in such a manner as to prevent rotation. If desired, the top 11a and bottom 11b of rear housing 11 may be slanted inwardly to seat within and engage the walls of a conventional supporting bracket formed of channel iron, such a construction preventing the turning of 11 once it is in position. The central or smaller diametrical section 37b of bolt 37 is not threaded, but to correspond with 37a, should be flattened on two opposite sides. Adjacent to this smooth portion is a second series of one or more concentric shoulders 37c, which protrusions are designed to complement like indentations 34 and 34a of checking elements 32 and 32a, being of a similar pitch and formation to shoulders 37a, but facing in an opposite direction on the bolt. The head 37d of 37 is threaded in an ordinary manner to receive nut 36, and is of such size that it will not pass through hole 21, and therefore cannot be removed from the box-like container without tearing away the face or the back of the seal, which fact compels the use of this bolt since no substitution is possible.

It is necessary before finally sealing in box 10 to loosely unite bolt 37 with nut 36, as by turning the bolt up to the point where shoulders 37c come into contact with tongues 26 and 26a of 25 (Fig. 5), and when thus jointed and the elements assembled in the foregoing order and manner, the sides of 10 may now be securely united, as in the case of 11, by crimping, spot-welding, or the employment of any other method which will insure a neat and staunch container securely housing and holding in alignment said elements, and precluding access thereto without the destruction of the container itself.

In operation my device works as follows: Bolt 37 is passed through the article to be sealed or attached, as for instance an automobile tag 38 (Fig. 1), then through supporting bracket 39, and next through the hole 13 in the back mounting. Pressure is now exerted against this element, such pressure sliding wedges 17 and 17a outwardly along the sides 16 of 14, and against the tension of spring 20 to a point at which shoulders 37a of bolt 37 snap into engagement with complementary indentations 19 and 19a of locking wedges 17 and 17a. The head of the bolt now cannot be withdrawn, because the shape of said notches is such that once the notches of the bolt engage those of the wedges, any attempt to withdraw the bolt simply carries the wedges back up against the tapered sides of 14, the greater the stress applied, the greater the locking action, in view of the wedge-like action thus invoked spring 20 keeps the elements firmly in alignment, while the limited width of 11 prevents a greater forward movement of the parts than is necessary for initially locking the bolt within the container.

Having thus locked the tag to the supporting bracket, it is now only necessary to secure the device in place, which is done by tightening nut 36 with a wrench or other suitable device, which operation successively slips the concentric ring or rings 37c of bolt 37 past tongues 26 and 26a of a retaining plate 25, and into locking engagement with complementary indentations 34 and 34a of checking elements 32 and 32a, sufficient expansion of these parts being permitted by the spring-like wings 29 and 29a of container 28 to allow the bolt to be thus forced inwardly; but the shape of said rings or shoulders preventing the bolt's being withdrawn once it has been thus forced into position. It will be further noted that 28 is so formed that the parts 29 and 29a thereof exert their greatest pressure upon elements 32 and 32a at the point of final tightening of nut 36, which pressure likewise serves to prevent said nut from loosening from vibration.

Retaining plate 25 and more particularly tongues 26 and 26a thereof, furnish a secondary checking element accomplishing a like purpose, for while in view of the opening 31 in container 28, said tongues may be flexed forwards towards the face of the seal, the bottom or back of 10 prevents their likewise being bent rearwardly, and should rings 37c of bolt 37 come into contact with said tongues in an attempt to withdraw said bolt, as would of necessity occur should any such attempt be made and the effectiveness of checking elements 32 and 32a in conjunction with 28 in some manner be circumvented, 26 and 26a would immediately engage said shoulders and prevent the bolt from being withdrawn. The enlarged head 37d of bolt 37 offers a still further obstacle to the withdrawal of the bolt, and since this head is larger than hole 21 of 10, removal of said bolt is impossible without destruction of the container.

From the foregoing it is apparent that when bolt 37 is once in operative position, it cannot be withdrawn or loosened, because of the engagement of checking elements 32 and 32a with the concentric ring or rings of said bolt, these parts being held in firm contact by means of 28 and the pressure of elements 29 and 29a thereof, so that when nut 36 is backed up, it pushes the face or cover off of container 10 and destroys the seal. When it is necessary to remove the tag, as at the end of a year, the face of the seal may be thus backed off, part 28 destroyed by bending back wings 29 and 29a in order to release bolt 37, and then breaking retaining plate 25 to allow the bottom of the container to come away from the tag far enough to cut the bolt, which must be done before the tag can be separated from the bracket. Summarily stated, the tag cannot be removed without destroying the seal, and locking bolt, which fact demonstrates the effectiveness of my sealing device.

If desired, indicator 12 may be provided with a suitable hole 12a near its end (Fig. 22); and then after being passed through or around the article to be sealed, or around the outside edge of an automobile tag, be bent downwardly to a point where bolt 37 may be passed through hole 12a and hence into rear element 11, the device then being snapped into preliminary engagement and tightened in the conventional manner described heretofore. When thus used, the article sealed cannot be released without either destroying the seal or breaking the device thus sealed. It is further to be noted that my seal cannot be used more than one time, since to remove it requires what amounts to destruction of the seal, which fact further augments the value of the device as a certain checking element.

When desirable, the front portion of my sealing device may be made integral with a license tag, and one continuous piece of metal used for both the tag and the front of the seal, a lay-out for such a construction being shown in Fig. 20.

When stamped as shown in Fig. 20, the metal is next bent in the proper directions along the dotted lines to form a box-like enclosure on top of the plate, housing elements 25, 28, 32, 32a, 36 and 37 in the manner described heretofore. The edges of the container may be crimped, or tabs 40, 40a and 40b spot-welded and a tamper-proof container thus provided. Fig. 21 illustrates the device thus made, assembled and ready to be attached to a motor car, it being only necessary to pass the locking bolt through the hole in the bracket and into engagement with the rear sealing element described heretofore, and then tighten nut 36, thereby firmly mounting the tag in permanent position. This is particularly true when the top and bottom of rear element 11 are tapered forwardly so that the device engages the channel of a supporting bracket, it then being impossible to turn or rotate said element in either direction.

If desired, the front portion of my seal may be made from a single stamping of metal, as in the case of an integral construction with a tag described above, and comprise a separate element, as by cutting off the top section along line 41 (Fig. 20). In such a strip device it may be desirable to form a second sealing element at its opposite end, such a structure being identical at its right end to that illustrated at the left end in the drawings. When so fabricated, the space on the strip between the two housings may be used for any legend, such as the name of the city or county in which the vehicle is registered; the make of the car; or for advertising purposes, it being possible for a state to derive enough revenue from such to pay for the entire cost of the tag and seal.

From the foregoing it is apparent that I have described a new and useful sealing device embodying elements that cannot be substituted or circumvented. That my unique back indicator element discloses the condition at the back of the seal, and shows that a proper installation of the elements furnished has been made. That the retaining bolt cannot be withdrawn without destroying the seal, nor can the tightening nut be taken out and another substituted without damaging the front of the seal. That any attempt to remove the device by backing off said nut will result in pushing the face off the seal. That all these factors unite to produce a positive, efficient, economical and thoroughly desirable device of the foregoing type. It will be apparent that my sealing device may be used omitting one or more of the elements described herein; and that certain changes may be made in the preferred embodiment described in this specification, such changes being contemplated and considered within the scope of this invention and the appended claims which are to be broadly construed.

I claim:

1. A sealing device comprising two box-like metal housings, a locking bolt within one of said housings, concentric shoulders upon said bolt, a retaining plate within the housing, a retainer box adjacent said retainer plate, checking elements within said retainer box, said elements having complementary indentations to the concentric shoulders of the bolt constructed to engage said bolt and prevent the withdrawal thereof, and means within the second housing to retain said bolt therein once it is engaged therewith.

2. A sealing device comprising two box-like metal housings, a locking bolt within one of said housings, concentric shoulders upon said bolt, a retaining plate engaging said bolt within said housing, a retainer box adjacent the plate, spring-like wings forming the sides of said retainer box, checking elements within said box, a nut engaging the end of the bolt, and means within the second housing to retain said bolt therein once it is engaged therewith.

3. A sealing device comprising two box-like metal housings, a locking bolt disposed within one of said housings, a retaining plate engaging concentric shoulders upon said bolt, a retainer box adjacent said plate within the housing, spring-like wings forming the sides of said retainer box, checking elements within the box, said elements having complementary indentations to the shoulders of said bolt, and wedge means within the second housing to retain said bolt therein once it is engaged therewith.

4. A sealing device comprising two box-like metal housings, a locking bolt disposed within one of said housings, a retaining plate engaging concentric shoulders upon said bolt, a retainer box adjacent said plate within the housing, spring-like wings forming two sides of said retainer box, checking elements within the retainer box, said elements having complementary indentations to the shoulders of said bolt, said indentations being constructed to engage and lock therewith and prevent the withdrawal of the bolt from the box, a nut engaging one end of said bolt, a shoulder on said nut preventing its being removed from the housing, and means within the second housing to retain said bolt therein once it is engaged therewith.

5. A sealing device comprising two box-like metal housings, a locking bolt secured within one of said housings, means within said second housing to prevent said bolt from being withdrawn therefrom once it is engaged therewith, and an indicator integral with and forming part of said second housing, said indicator comprising a metal strip of a character such as to indicate any tampering with said housing.

6. A sealing device comprising a box-like metal housing integral with a license plate, a second housing, a locking bolt having its ends positioned in said housing and means within each housing to permanently retain the locking bolt therein once it is associated therewith.

7. A sealing device comprising two box-like metal housings, a locking bolt disposed within one of said housings, a retaining plate engaging concentric shoulders upon said bolt, a retainer box adjacent said plate, checking elements within said box, indentations within said checking elements constructed to engage with the concentric shoulders upon said bolt and prevent said bolt from being withdrawn from the housing, a nut associated with said bolt, a shoulder upon said nut preventing it from being removed from the housing, and wedge means within the second housing to retain said bolt therein once it is engaged therewith.

8. A sealing device comprising two box-like metal housings, a locking bolt secured within one of said housings, means within said second housing to prevent said bolt from being withdrawn therefrom once it is engaged therewith, and an indicator having an aperture near the end thereof, integral with and forming part of said second housing.

9. A sealing device comprising two box-like metal housings, a locking bolt secured within one of said housings, a collar within said second housing, wedge means seating within said collar to prevent the withdrawal of said bolt once it is engaged therewith, and a coil spring within said second housing for the purpose of normally keeping said wedge means in a locking position.

10. A sealing device comprising two box-like metal housings, a locking bolt secured within one of said housings, concentric shoulders upon one end of said bolt, a collar within said second housing, wedge means operating within said collar, concentric rings within said wedge means engaging said shoulders upon said bolt and preventing the bolt from being withdrawn from said second housing once it becomes engaged therewith.

11. A sealing device comprising two box-like metal housings, a locking bolt permanently secured within one of said housings, concentric shoulders upon one end of said bolt, a collar within said second housing, wedge means associated with said collar, concentric rings within said wedges engaging the complementary shoulders of said bolt and preventing withdrawal thereof once the bolt is positioned within said second housing, and a metal indicating strip integral with said second housing.

12. A sealing device comprising two box-like housings, a locking bolt within one of said housings, the face of said housing being scored to form lines of frangibility thereon so that when the housing is subjected to unusual strain the face thereof will break along said lines; and means within the second housing preventing said bolt from being withdrawn therefrom once it is engaged therewith.

13. A sealing device comprising two box-like metal housings, a locking bolt disposed within one of said housings, a retaining plate engaging concentric shoulders upon said bolt, a retainer box adjacent said plate within the housing, spring-like wings forming the sides of said retainer box, checking elements within the box, said elements having complementary indentations to the shoulders of said bolt, said indentations being constructed to engage and lock therewith and prevent the withdrawal of the bolt from the box, a nut engaging one end of said bolt, a shoulder on said nut preventing its being removed from the housing, wedge means operating within the second housing, said wedge means having concentric rings engaging complementary shoulders upon said bolt and preventing the bolt from being withdrawn from said second housing once it is engaged therewith.

THOMAS C. ARNOLD.